INVENTOR.
ANDREW MARTON ent Office 3,182,903
Patented May 11, 1965

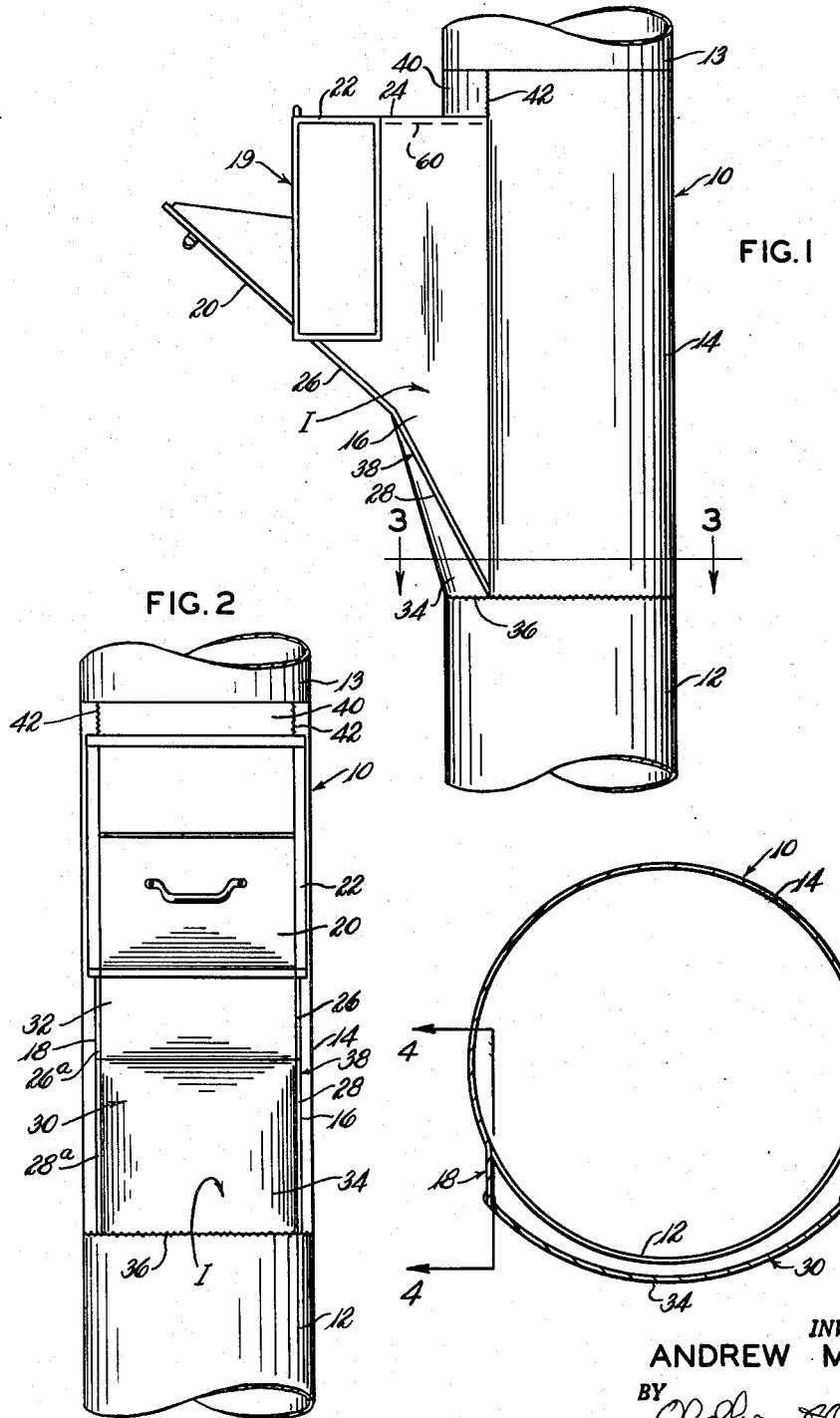

3,182,903
INTAKE THROAT AND HOPPER DOOR ASSEMBLY
FOR VERTICALLY EXTENDING CHUTES
Andrew Marton, Akron, Ohio, assignor to Wilkinson
Chutes, Inc., Akron, Ohio, a corporation of Ohio
Filed Feb. 4, 1963, Ser. No. 255,799
7 Claims. (Cl. 232—43.1)

This invention relates to a novel intake throat and hopper door assembly for vertically extending chutes and more particularly to an improved sloped construction of the access throat.

It has been known that there are many and varied types of vertically extending chutes for use in more convenient disposal of rubbish, garbage, soiled linen, etc., from remote stations to a central collection station. In apartments, hospitals, or office buildings, the chutes normally extend from the top floor to a station at the bottom floor where the articles deposited in the chute are collected. Usually, there are also access openings to the chute on each floor between the top and bottom floors. Troubles have been experienced at these intervening station access openings with the articles falling from above tending to be disrupted in their gravitational fall because the normal inner contour of the chute is interrupted by the access opening. It has been known, particularly in rubbish or garbage chutes, that frequently a dropped box, article, or other means may become wedged in one of these openings, causing the chute to be clogged. Also, these chutes tend to break, or wear out at the seam formed where the intake throat attaches to the access opening to the chute, because of articles falling from above repeatedly hitting the ledge formed at the bottom of the access opening by the intake throat.

It is the general object of the invention to avoid and overcome the foregoing and other difficulties of and objections to prior art practices by the provision of an offset intake access throat comprising one or more sharply inclined sloping sections to virtually eliminate any possibility of falling articles wedging in or bridging over the chute at the access openings therein.

Another object of the invention is to provide an intake throat and hopper door assembly for a vertically extending chute which is made from only a few easily shaped metal pieces, which eliminates welding in potential high stress areas, and which operates very effectively even when used with large, heavy and bulky articles.

Another object of the invention is to provide an access opening to a vertical chute which utilizes a continuous, gradually sloping intake throat, which has a smooth, sharply inclined contour to eliminate any ledge areas which might be susceptible to effecting clogging or to be damaged by articles falling from above and striking thereon.

Another object of the invention is to provide a novel and improved hopper or access door for a vertically extending chute where the hopper door assembly includes an intake throat forming member that blends smoothly into the contour of the vertically extending chute by a plate section inclined at an angle of about 70° to the horizontal.

Another object of the invention is to provide an offset intake throat and hopper assembly for a disposal chute which is highly effective in use, extremely durable of construction, yet relatively simple in construction, and quite inexpensive to make.

The aforesaid objects of the invention, and other objects which will become apparent as the specification proceeds, are achieved by providing an intake throat and hopper door assembly for a vertically extending chute which has in combination an access opening, a pair of parallel vertically extending side walls extending outwardly from the opening to define the sides of the intake throat, the side walls being an integral part of the chute, the side walls having corresponding inwardly and downwardly directed tapered edges on the lower portions thereof to define a taper for the intake throat, a front plate affixed to the tapered edges of the side walls to define a downwardly and inwardly sloping closed front of the intake throat, and a hopper door operably mounted on the side walls at the upper portions thereof to provide an opening to the intake throat.

For a better understanding of the invention, reference should be had to the accompanying drawings wherein:

FIGURE 1 is a side elevation of one embodiment of the invention;

FIGURE 2 is a front elevation of the intake throat and hopper door of the invention as shown in FIGURE 1;

FIGURE 3 is an enlarged horizontal cross sectional view of the access intake throat taken on the line 3—3 of FIGURE 1;

Figure 4:
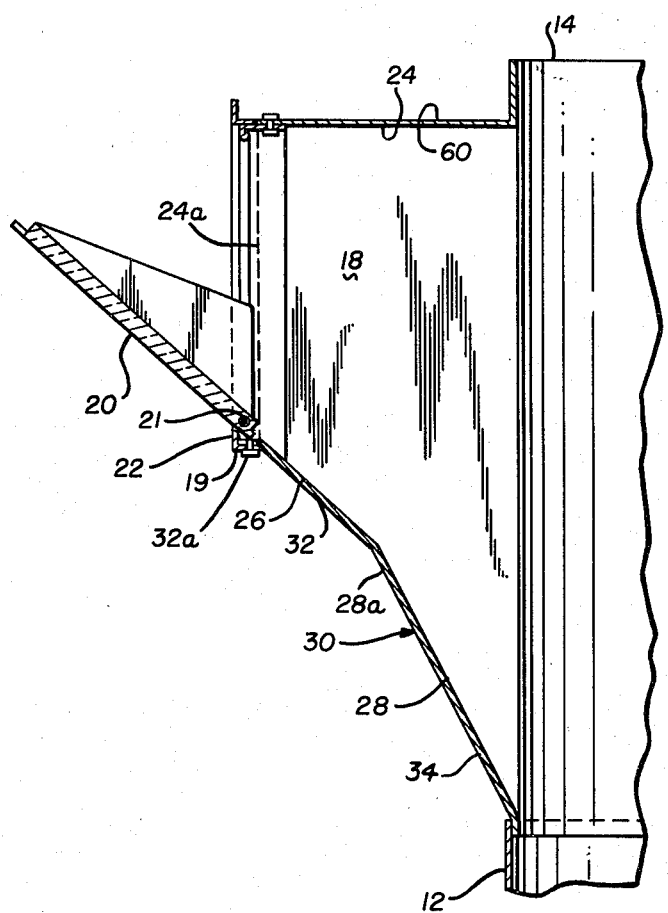
FIG. 4 is a fragmentary enlarged vertical section, taken on line 4—4 of FIG. 3, through the intake throat, door and associated means.

With specific reference to the form of the invention illustrated in the drawings, the numeral 10 indicates generally a cylindrically shaped disposal chute, comprising a cylindrically shaped bottom chute section 12 and a cylindrically shaped top or upper chute section 13, both being operatively connected by a cylindrically shaped connecting section, or wall 14. The section 14 has a longitudinal opening in one side thereof, with the opening being defined by a pair of parallel, outwardly extending side walls denoted by numerals 16 and 18. The section 14 is formed as one continuous, integral piece to include the side walls 16 and 18.

As best seen in FIGURE 1, an access door assembly, indicated generally by the numeral 19, and comprising a hopper door 20, suitably journalled on a rod 21 carried by the frame 22, is mounted and carried by the outwardly extending side walls 16 and 18. The frame 22 engages portions of the side walls 16 and 18 and is bolted, or otherwise secured thereto in any convenient manner. The side wall 16 terminates in a horizontal top edge 24, a vertical front edge 24a (coinciding essentially with the vertical front edge of the frame 22), an inwardly and downwardly tapered edge 26, and a second inwardly and more sharply downwardly tapered edge 28, which edge 28 terminates flush with the section 14 at the common edge between the section 14 and the chute section 12. The corresponding side wall 18 is formed identical to the side wall 16, as just described, and has edges 26a and 28a formed thereon.

In order to close the opening between the tapered sections of the side walls 16 and 18, a plate, denoted generally by the numeral 30, is provided, as best seen in FIGURE 2, which extends between the side walls 16 and 18 from the top of the chute section 12 to the bottom of the hopper frame 22. The plate 30 is so formed that it has a flat upper section 32 which is affixed to the tapered edges 26 and 26a of the side walls 16 and 18, respectively. However, a bottom section 34 of the plate 30 is substantially flat shaped at the top, but more arcuately shaped at the bottom as it is affixed to the tapered edges 28 and 28a of the side walls 16 and 18, respectively, besides being affixed, as by welding at 36, to the arcuate edge at the top of the chute section 12. This change of contour to a semi-curve from the semi-flat upper portion of the section 34 of the plate 30 is also shown in FIGURES 1 and 3. The top edge of the upper section 32 of the plate 30 is usually affixed to the frame 22 in any convenient manner, as by welding or screws 32a. The faces 32 and 34 of the plate 30 are normally joined to the edges of the side walls 16 and 18 by sheet metal lock seams, indicated generally by the numeral 38, such as "Pittsburgh Lock Seams," to complete the intake throat I that operatively connects to the access door assembly 19.

In order to close the open horizontal top section between the side walls 16 and 18 at the edges 24 thereof, a flat plate 60 is normally affixed in place and connected to the frame 22 by any convenient means. An arcuate shaped plate 40 is affixed in place, as by welds 42, to complete the enclosure of the throat structure.

The utility of the disclosed invention relates to the double sloping, offset access, or intake throat I provided by the invention. In the herein presented apparatus, the rather substantial offsetting of the hopper door 20 achieved by the double sloping intake throat I and its relationship to the section 14 completely eliminates any substantially horizontal ledges in the intake throat I so that clogging of the chute is virtually eliminated.

It has been found that offsetting the joining point between faces 32 and 34 of the plate 30 by, for example, a minimum of two inches radially outside the projection of the cylindrical chute, to which the intake throat I is secured, has achieved superior results to that of prior constructions, for example, in conventional sizes of laundry chutes.

It should be noted that the whole unit is extremely simple in construction and may comprise, for example, four pieces of metal. One is the cylindrical section 14 with the parallel side walls 16 and 18 extending out towards the hopper door 20; the second is the bottom angular front plate 30 with the two sloped contours completing the intake opening; and the third and fourth pieces are the small pieces at the top of the intake hopper including the plate 60 in the horizontal plane and an arcuate piece 40 completing the cylindrical portion.

The drawings clearly show that the frame 22 has a depth as to be received in the walls of a conventional building, which walls normally are 4 inches thick. This frame or frame means 22 can be made from any suitable sheet metal means, angles, channels, or the like. It will be seen that the portion of the front sheet, or plate 30 of the intake throat I of the invention has its break in contour provided therein in substantially vertical alignment with the laterally inner surface of the wall with which the chute means of the invention ultimately will be assembled. The upper end 32 of the plate 30 is at less inclination, such as about 50° to 60°, than the bottom section 34 which has an inclination to the horizontal of about 70° to 75°. By making the plate 30 of angular shape, it can be brought through the wall at a desired angle and then be sharply inclined downwardly by a joint laterally offset from the margins of the chute. The upper end, or wall section 32 of the plate 30 still is at an angle of more than about 45° so that no substantially horizontal ledge is provided in the chute. Portions of the side walls 16 and 18 and other associated means in the intake throat and hopper door assembly hence can extend through a wall at a selected angle to the horizontal, but thereafter the intake throat of the hopper is more sharply downwardly directed whereby any articles dropped into the chute means from an upper floor and contacting this portion of the intake throat will tend to be deflected vertically downwardly in the chute and will not collect on the intake portion of the chute.

It will be realized that the chute means shown in the drawings will normally be associated with a building having a plurality of floors therein, and that an intake means, or hopper door will be provided, usually, on each floor of this building for receipt of articles to drop down the vertical chute means.

FIGURE 3 of the drawings also shows that the maximum offset of the intake throat I occurs at the sides of the throat at the connection to the side walls 16 and 18.

While in accordance with the patent statutes one best known embodiment of the invention has been illustrated and described in detail, it is to be particularly understood that the invention is not limited thereto or thereby, but that the inventive scope is defined in the appended claims.

What is claimed is:
1. In combination in a vertical chute,
   an upper chute section,
   a lower chute section,
   a connecting chute section secured to and extending between said chute sections,
   said connecting chute sections having ends shaped complementary to said upper and lower chute sections and having a pair of parallel vertically extending side walls extending therefrom with edges offset laterally from said vertical chute, which edges are inwardly and downwardly directed,
   a hopper door and frame means therefor operatively secured to said side walls adjacent the upper margins thereof,
   said side walls being at the lower end of said connecting chute section, and
   a front plate suitably secured to said edges of said side walls and connecting at its lower end to said lower chute section at its upper end, said front plate being sharply inclined to the horizontal, said front plate having a portion directly below said frame means operatively connected thereto and being at a smaller angle to the horizontal than said lower end thereof.

2. In combination,
   a chute section adapted to be vertically positioned in use,
   said chute section having a longitudinal opening in a side thereof defined by a pair of parallel vertically extending side walls extending from the chute with edges offset laterally from said vertical chute and being inwardly and downwardly directed,
   a hopper door,
   frame means for said hopper door operatively secured to said side walls adjacent the upper margins thereof, said hopper door being journalled on said frame means,
   said side walls being at the lower end of said chute section, and
   a front plate suitably secured to said edges of said side walls and inclined at its lower end at least at an angle of about 70° to the horizontal, said front plate having an upper portion directly below said frame means connected thereto and being at a smaller angle to the horizontal than said lower end thereof.

3. In an intake throat and hopper door for a vertically extending cylindrically shaped chute, the combination of a vertical opening to the intake throat, a pair of parallel vertically extending side walls defining the sides of the throat, said side walls being an integral part of the chute, said side walls having corresponding inwardly and downwardly directed cuts on substantially the lower halves thereof to define two distinct slopes to the intake throat, the first slope being of one angle in relation to the chute and extending from the chute upwardly and outwardly and terminating in the second slope, said second slope being of an angle greater than said first slope in relation to the chute and extending to the bottom of the vertical opening to the access throat, said first slope and said second slope meeting at a point substantially laterally displaced outside the circumference defining the cylindrically shaped chute, a front plate affixed to the tapered sections of the side walls to define the downwardly and inwardly double sloping closed front of the intake throat, a horizontal top plate affixed to the horizontal top edges of the side walls to close the top opening to the intake throat, and a door mounted on the vertical opening to the intake throat.

4. A combination as in claim 1 where said chute sections have a standard contour, and said front plate forms an angle at the connection between its lower end and said portion of said front plate, the apex of said angle being laterally offset from said chute sections contour at least about two inches.

5. In an intake throat and hopper door for a cylindrically shaped chute which is vertical when operatively positioned, the combination of a cylindrically shaped chute having a vertical opening for an intake throat formed in one vertical portion thereof, a pair of parallel vertically extending side walls defining the sides of the throat, said side walls being a unitary part of the chute and extending laterally therefrom, said side walls having corresponding horizontal top edges, vertical edges, and inwardly and downwardly directed edges on the lower portions thereof to define two distinct slopes for the intake throat, the first slope being of one angle in relation to the chute and extending from the chute upwardly and outwardly and terminating in the second slope, said second slope being of an angle greater than said first slope in relation to the chute and extending to the bottom of the vertical opening for the access throat, said first slope and said second slope meeting at a point laterally displaced radially outside the circumference defining the cylindrically shaped chute, a front plate affixed to the sloped edges of the side walls to define a downwardly and inwardly double sloping closed front for the intake throat, a horizontal top plate affixed to the horizontal top edges of the side walls to close the top opening to the intake throat, and a door pivotally and operatively mounted on said vertical edges of said walls at the vertical opening to the intake throat.

6. In an intake throat and hopper door assembly for a chute, the combination of a cylindrically shaped chute having a vertical opening for an intake throat formed in one vertical side portion thereof, said chute normally being vertically positioned, a pair of parallel vertically extending side walls defining the sides of the throat, said side walls being secured to the chute and extending laterally therefrom, said side walls having corresponding horizontal top edges, vertically extending edges, and inwardly and downwardly directed edges on the lower portions thereof to define two distinct slopes for the intake throat, the first slope being of one angle in relation to the chute and extending from the chute upwardly and outwardly and terminating in the second slope, said second slope being of an angle greater than said first slope in relation to the chute and extending to the bottom of the vertical opening for the access throat, said first slope and said second slope meeting at a point laterally displaced outside the circumference defining the cylindrically shaped chute, a front plate affixed to the sloped edges of the side walls to define a downwardly and inwardly double sloping closed front for the intake throat, frame means secured to said vertical edges of the side walls to outline an opening to the intake throat, and a door pivotally and operatively mounted on said frame means.

7. In combination in a vertical chute,
an upper chute section,
a lower chute section,
a connecting chute section secured to and extending between said chute sections,
said connecting chute sections having ends shaped complementary to said upper and lower chute sections and having a pair of parallel vertically extending side walls extending therefrom with edges offset laterally beyond the margins of said connecting chute section, which edges are inwardly and downwardly directed at portions thereof and have upper sections that are vertically positioned,
a hopper door and frame means therefor operatively secured to said side walls at the upper sections, and
a front plate suitably secured to said inwardly and downwardly directed edges of said side walls, said front plate at its lower end being sharply inclined to the horizontal, said front plate having a portion below said frame means operatively connected thereto and being at a smaller angle to the horizontal than said lower end thereof, said front plate portion connecting to said front plate lower end at a junction that is laterally offset outwardly from the margins of said connecting chute section.

References Cited by the Examiner
UNITED STATES PATENTS

| | | | |
|---|---|---|---|
| 981,921 | 1/11 | Tordyce | 193—8 |
| 1,450,139 | 3/23 | Cusick | 232—45 |
| 3,109,586 | 11/63 | Kohn | 232—43.1 |

FRANK B. SHERRY, *Primary Examiner.*